(No Model.)

A. BETTS.
DRILLING MACHINE.

No. 493,471. Patented Mar. 14, 1893.

Witnesses:
R. Schleicher
P. D. Goodwin

Inventor
Alfred Betts
By his Attorneys
Howson & Howson

United States Patent Office.

ALFRED BETTS, OF WILMINGTON, DELAWARE, ASSIGNOR TO THE BETTS MACHINE COMPANY, OF SAME PLACE.

DRILLING-MACHINE.

SPECIFICATION forming part of Letters Patent No. 493,471, dated March 14, 1893.

Application filed July 23, 1892. Serial No. 441,047. (No model.)

*To all whom it may concern:*

Be it known that I, ALFRED BETTS, a citizen of the United States, and a resident of Wilmington, in the State of Delaware, have invented certain Improvements in Supporting and Adjusting Devices for the Work-Tables of Metal-Drilling and other Machines, of which the following is a specification.

My invention consists of certain improvements in supporting and adjusting devices for the work tables of horizontal boring and drilling machines and machines of like character, where it is desired that the table shall be supported at several points and that each of the supporting devices shall be capable of simultaneous adjustment, as more fully set forth hereinafter.

Figure 3:
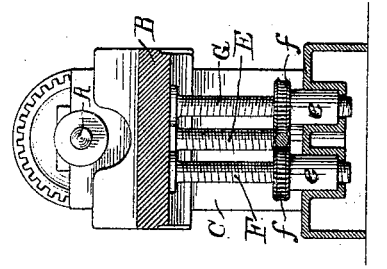
Figure 1:
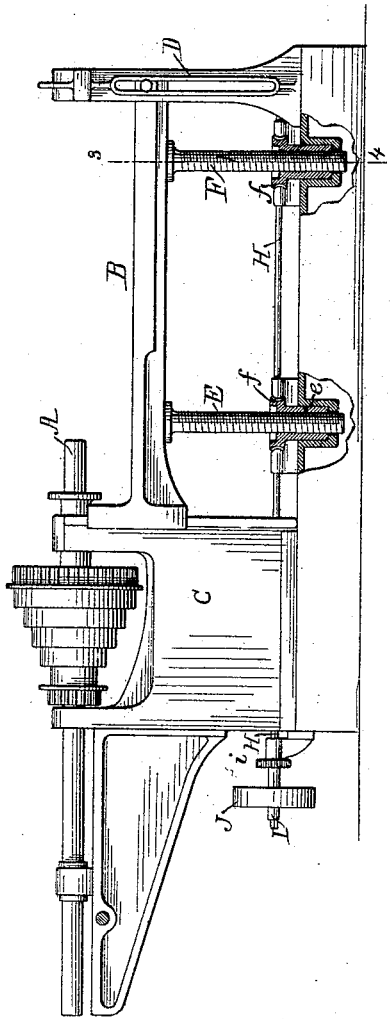
Figure 2:
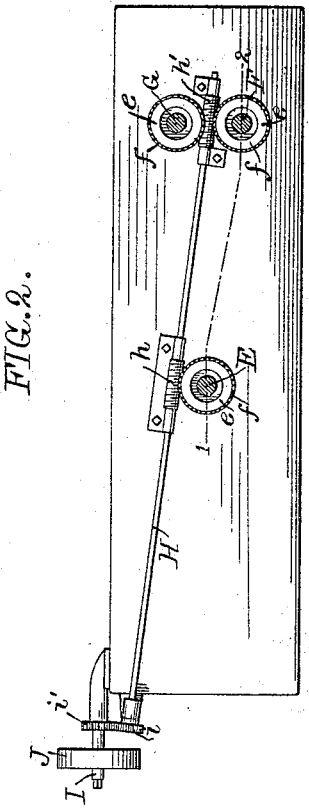

In the accompanying drawings:—Figure 1, is an elevation, partly in section, on the line 1—2, Fig. 2. Fig. 2, is a plan view of the bed plate showing the supporting screws in section; and Fig. 3, is a transverse sectional elevation on the line 3—4, Fig. 1.

In machines of the character illustrated in the drawings where the tool spindle A is rotated and reciprocated by any desired mechanism, the work table B is usually guided at one end by the supporting head C and at the opposite end by a removable steady rest D which also forms a support for the boring bar. It is sometimes found necessary, in drilling large work, to remove this steady rest, and the adjusting devices for effecting the vertical movement of the table must in that event, support and guide this end of the table. To that end I employ a series of vertically adjustable screws E, F and G, which are distributed in such a manner that the removal of the steady rest will not in any way affect the stability of the table B. The screws employed are preferably three in number although, of course, a greater number may be employed where the table is to support heavy work. The screw E is situated near the center of one end of the table; and the screws F and G are placed at points equi-distant from the center and near the opposite end of the table. At the lower end of each screw is a nut $e$ and secured to or forming part of each nut is a worm wheel $f$ the nuts and worm wheels being so arranged and supported in pockets in the base of the machine so as to turn freely on the screw and adjust the table in either direction.

Extending diagonally across the base of the machine is a shaft H on which are secured worms $h$ and $h'$, the worm $h$ meshing with the worm wheel of the screw E and the worm $h'$ meshing with both of the worm wheels of the screws F and G; the two latter screws being provided with threads of the same pitch but running in opposite directions so that the rotation of the worm $h'$ will effect precisely the same extent of movement of each screw and the table will be adjusted to precisely the same extent at each of its three or more supports. On or near the outer end of the shaft H is a bevel gear $i$, with which engages a similar wheel $i'$ mounted upon a shaft I which latter also carries a belt wheel J by means of which the necessary power may be transmitted to the shaft H to adjust the table and a more delicate adjustment is provided for by making the outer end of the shaft I of square or other suitable form to which a wrench or key may be applied, as will be readily understood.

Having thus described my invention, I claim and desire to secure by Letters Patent—

The combination with a work table, of the adjusting screws E, F and G, nuts thereon, worm wheels secured to or forming part of said nuts, a shaft H, a worm thereon engaging with the worm wheel of the nut on the screw E, and a second worm $h'$ also mounted on the shaft H and engaging with the worm wheels of the nuts on the screws F and G, substantially as specified.

In testimony whereof I have signed my name to this specification in the presence of two subscribing witnesses.

ALFRED BETTS.

Witnesses:
WILLIAM BETTS,
CHARLES S. GOOD.